(12) United States Patent
Neal et al.

(10) Patent No.: US 11,949,369 B2
(45) Date of Patent: Apr. 2, 2024

(54) CLAMP APPARATUSES AND COMPONENTS THEREOF FOR MOUNTING SOLAR PANEL MODULES

(71) Applicant: Unirac Inc., Albuquerque, NM (US)

(72) Inventors: Jonathan Neal, Albuquerque, NM (US); Todd Ganshaw, Albuquerque, NM (US)

(73) Assignee: UNIRAC INC., Albuquerque, NM (US)

( * ) Notice: Subject to any disclaimer, the term of this patent is extended or adjusted under 35 U.S.C. 154(b) by 130 days.

(21) Appl. No.: 17/344,403

(22) Filed: Jun. 10, 2021

(65) Prior Publication Data

US 2022/0060143 A1 Feb. 24, 2022

Related U.S. Application Data

(60) Provisional application No. 63/068,271, filed on Aug. 20, 2020.

(51) Int. Cl.
*H02S 30/00* (2014.01)
*F16B 5/06* (2006.01)
(Continued)

(52) U.S. Cl.
CPC ............ *H02S 30/00* (2013.01); *F16B 5/0685* (2013.01); *F16B 37/045* (2013.01); *H01R 4/304* (2013.01)

(58) Field of Classification Search
CPC ...... H02S 30/00; F16B 5/0685; F16B 37/045; F16B 7/0473; H01R 4/304
See application file for complete search history.

(56) References Cited

U.S. PATENT DOCUMENTS 7,866,099 B2 1/2011 Komamine et al.
8,857,113 B2 10/2014 Zhang
(Continued)

FOREIGN PATENT DOCUMENTS

CN 202012534 U 10/2011
EP 1281877 A1 * 2/2003 ............ F16B 37/045
(Continued)

OTHER PUBLICATIONS

IronRidge UFOCL01B1 universal module clamp sold on amazon.com dated Nov. 16, 2018, https://www.amazon.com/IronRidge-UFOCL01B1-Universal-Module-Clamp/dp/B07KMCPFVM (Year: 2018).*

(Continued)

*Primary Examiner* — Terrell L Mckinnon
*Assistant Examiner* — Ding Y Tan
(74) *Attorney, Agent, or Firm* — Lee & Hayes P.C.; Mike Merkelbach

(57) ABSTRACT

A clamp assembly includes a clamp with a lateral edge support portion that extends in a first direction to support against a lateral edge of the module. A flange extends in a second direction transverse to the first direction to clamp against an upper surface of the solar panel module in coordination with the lateral edge support portion. A nut is configured to align with the clamp. The nut receives a fastener. The nut has an outer surface to engage the second surface of the lateral edge support portion to prevent rotation of the nut. A connection member extends from the nut in a position that is fixed. A head of the connection member is shaped such that, in a first orientation, the head is accommodated passage through a slot in the intermediary member, and in a second orientation, the head is prevented from passage through the slot.

20 Claims, 9 Drawing Sheets

(51) Int. Cl.
*F16B 37/04* (2006.01)
*H01R 4/30* (2006.01)

(56) References Cited

U.S. PATENT DOCUMENTS

| | | | |
|---|---|---|---|
| 8,938,932 B1 | 1/2015 | Wentworth et al. | |
| 9,647,433 B2* | 5/2017 | Meine | F24S 25/634 |
| 9,825,581 B2 | 11/2017 | Wildes | |
| 9,876,463 B2* | 1/2018 | Jasmin | F24S 25/636 |
| 10,312,853 B2* | 6/2019 | MacRostie | F24S 25/636 |
| 10,749,459 B1* | 8/2020 | Liu | F16B 5/0685 |
| 11,313,591 B1* | 4/2022 | Atia | F24S 25/636 |
| 2012/0073220 A1 | 3/2012 | Kobayashi et al. | |
| 2016/0233820 A1* | 8/2016 | Redel | F16B 7/187 |
| 2016/0268958 A1* | 9/2016 | Wildes | H02S 20/23 |
| 2016/0282016 A1* | 9/2016 | Ash | H02S 30/10 |
| 2017/0104442 A1* | 4/2017 | MacRostie | H02S 20/23 |
| 2022/0010822 A1* | 1/2022 | Worden | F16B 35/06 |

FOREIGN PATENT DOCUMENTS

| | | | | |
|---|---|---|---|---|
| EP | 2410190 A1 | 1/2012 | | |
| ES | 1281877 A * | 5/2003 | | |
| WO | WO-2021150817 A1 * | 7/2021 | | F16B 2/065 |

OTHER PUBLICATIONS

Unirac solarmount universal AF clamp datasheet for SM-A01B, https://www.solarflexion.com/v/vspfiles/files/pdfs/unirac/302050D_Data_Sheet.pdf (Year: 2020).*

The International Search Report and Written Opinion for PCT Application No. PCT/US21/43460, dated Nov. 5, 2021.

* cited by examiner

CLAMP APPARATUSES AND COMPONENTS THEREOF FOR MOUNTING SOLAR PANEL MODULES

CROSS-REFERENCE TO RELATED PATENT APPLICATIONS

This application claims priority to and incorporates U.S. Provisional Patent Application 63/068,271, filed Aug. 20, 2020, entitled "Clamp Apparatuses and Components Thereof for Mounting Solar Panel Modules," in its entirety by reference.

BACKGROUND

Despite the numerous existing types and embodiments of clamps for mounting solar panel modules available or known, each seems to have a deficiency in at least one aspect or another, or if not perceived as a deficiency, it seems that there is room for improvement. That is to say, while in some cases, a clamp might be configured to include various independent features of multiple different known clamps (ignoring competitor patents for the sake of the example), thereby forming a product that might be superior in many aspects, there remain features desired by installers and users alike that enhance the ease of installation and improve the functionality, durability, strength, etc. For example, some clamps may not provide a satisfactory electrical bond between the module and the rail, other clamps may be overly complex by including a cumbersome number of parts or be challenging to install. Others still may be simple yet so simple that they are ultimately ineffective in adequately securing the module to a rail or other structure according to the design. Therefore, additional improvements to existing solar panel module clamps are desired.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to a universal clamp to secure solar panel modules. More specifically, embodiments of an end cap clamp and a mid clamp that may be claimed as variations of the universal clamp to secure modules of various sizes of solar panel modules. Features are further described as shown in the figures and expressed in the claims listing.

In an embodiment, a bonding clamp assembly includes a clamp, a nut, and a connection member. The clamp includes a lateral edge support portion that extends in a first direction to support against a lateral edge of a solar panel module ("module") and a flange that extends in a second direction transverse to the first direction to clamp against an upper surface of the module in coordination with the lateral edge support portion. The nut is configured to align with the clamp and engage with the second surface of the lateral edge support portion of the clamp to prevent rotation of the nut. The connection member extends from the nut in a position that is fixed, and a head of the connection member is shaped such that, in a first orientation, the head is accommodated passage through a slot in a rail segment, and in a second orientation, the head is prevented from passage through the slot in the rail segment. The clamp assembly electrically bonds with any one of a plurality of modules having a different thickness.

As used herein, the term "electrical bond," "electrically bonding," "bonding," or "grounding," includes any act of joining electrical conductors together. For example, the term "electrical bond," "electrically bonding," "bonding," or "grounding," includes the practice of intentionally electrically connecting metallic items together. The electrical bonding may be conducted in accordance with the National Electric Code (NEC).

Illustrative Embodiments

Figure 1:
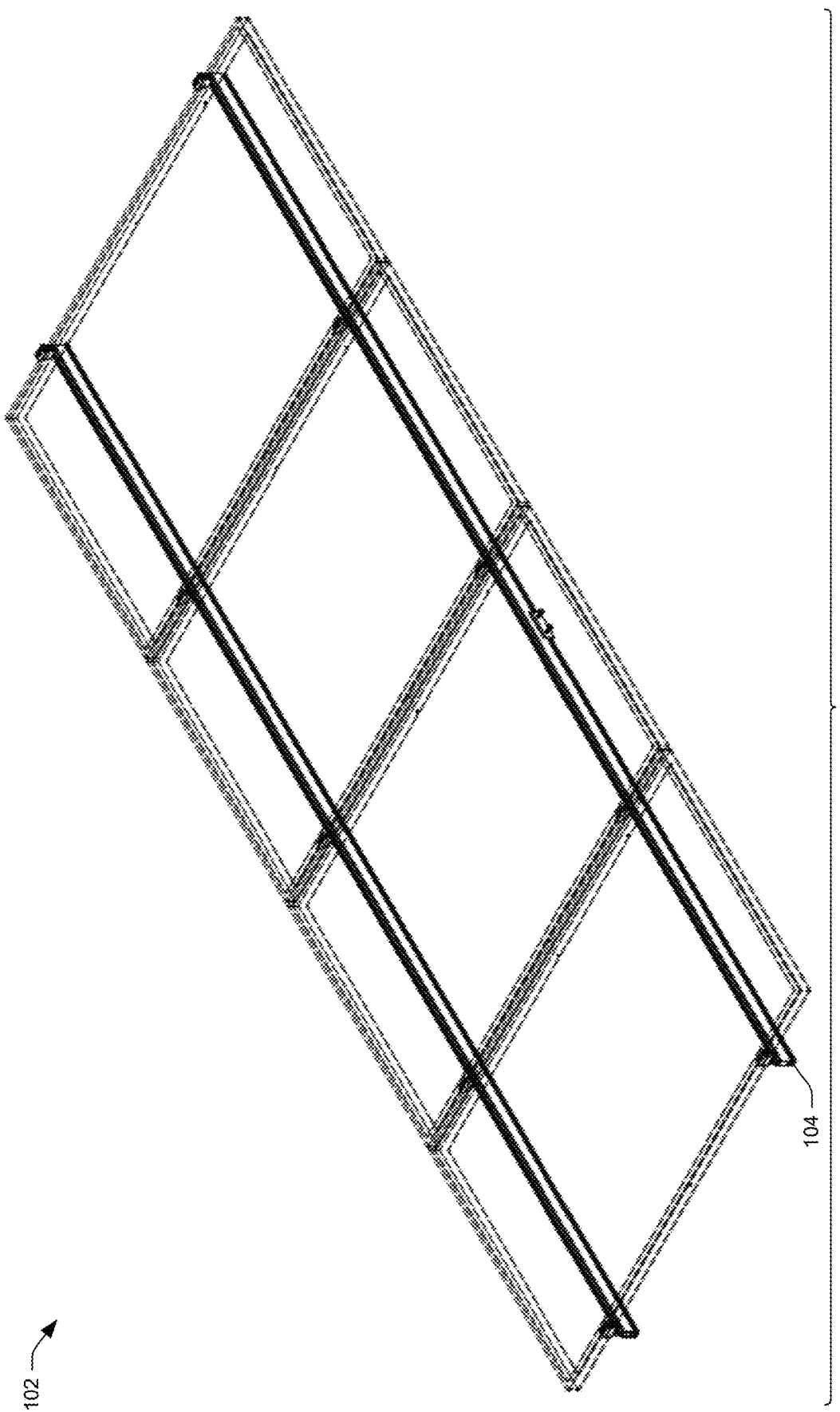
FIG. 1 illustrates a top perspective view of an exemplary solar panel mounting system including a rail segment for attaching to a bracket attachable to a roof.

FIG. 1 illustrates a top perspective view 100 of an embodiment solar panel mounting system 102 including a rail segment 104 (or rail), which may include an elongated member having a channel therein that extends through all or a portion of the length of the rail segment. For the purposes of this application, a rail segment 104 may be referred to as one of many contemplated possibilities of an "intermediary member" in that, in this instance, the expected use of the components of the mounting system 102 is to support solar panel modules upon a structure to prevent the modules from being directly against the mounting surface. Hence, the term "intermediary member" may be used whether a "rail segment" is used or if instead a substitute structure becomes the structure between (i.e., intermediate to) the mounted object (e.g., the solar panel module or other desired apparatus, device, etc.) and the roof or surface. In other words, while in the solar panel industry, the mounting system 102 is used for mounting solar panel modules on a rail segment structure, it is contemplated by the Applicant that there may be additional uses for one or more of the components of the disclosed mounting system or the system in its entirety.

Though minor adaptations may potentially be needed to serve other industries more effectively. Regardless of use, any use of the components as may be claimed based on the disclosure herein is considered proprietary to the applicant and within the scope of the disclosure.

Returning to the mounting system 102, the rail segment 104 may be attached to a bracket that is in turn attached to a roof. The rail segment 104 may be an extrusion. For example, the rail segment 104 may be a metal extrusion, such as an aluminum extrusion, although other suitable materials for manufacture may be considered according to desired performance and function. Notably, the term "rail" as used herein may refer either to a full length rail member according to various standards in the industry for rails, or to shorter segments less than a standard sized rail, such as those depicted in a figure in some instances. However, for the sake of this application, reference to a rail segment is to be understood to include a full standard length rail or a shorter than full length portion of a rail, inasmuch as the term segment is relative to different manufacturing standards anyway.

The solar panel mounting system 102 may mount solar panel modules ("modules") (not shown in FIG. 1, but discussed in more detail below) to a roof or other surfaces, structures, machines, etc. For example, the solar panel mounting systems may be used to mount modules to walls, to the ground, to poles, to bridges, to vehicles, etc. The sizes of the modules may vary. That is, the various distinct manufacturers of modules have not standardized the sizes of the modules available in the industry, and thus the size of each module may vary based on the manufacturer producing the module. For example, one manufacturer may produce a module having a thickness (e.g., height) of about 32 millimeters (mm), while another manufacturer may produce another different module having a thickness of about 40 mm. As such, the solar panel mounting system 102 may include a clamp assembly (not shown) (discussed in more detail below) that attaches to the rail segment 104 and electrically bonds with any one of the modules having a different thickness. For example, the clamp assembly may attach to the rail segment 104 and electrically bond to a module having a thickness of about 32 mm. In another example, the clamp assembly may attach to the rail segment 104 and electrically bond to another different module having a thickness of about 40 mm. Different modules may have different respective thicknesses depending on a solar cell efficiency of the modules. For example, modules may have different respective thicknesses depending on strength and/or cost. Regardless, a solar panel mounting system as described herein facilitates a user (e.g., an installer, a technician, etc.) to quickly and easily install modules having varying thicknesses on surfaces such as the ground or a roof, structures, machines, etc. as desired. The clamp assembly may provide for fitting modules having a size of at least about 32 mm to about 40 mm. Although, the range of thicknesses as aforementioned is not to be understood as a limit on the capability of the instant disclosure to accommodate sizes outside of that range.

Figure 2:
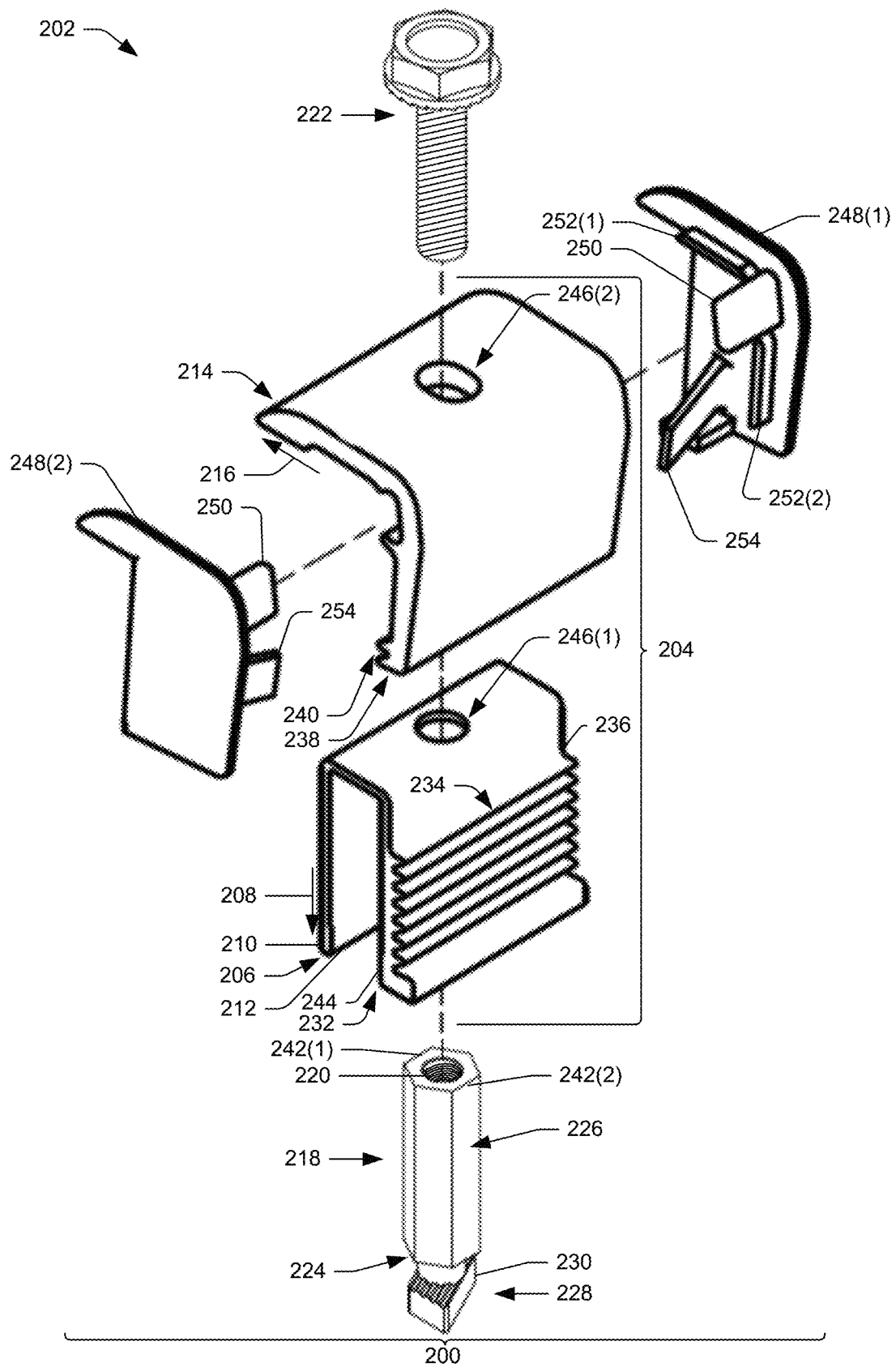
FIG. 2 illustrates an exploded view of a universal clamp in an embodiment of the instant disclosure as an end clamp.

FIG. 2 illustrates an exploded view 200 of a universal clamp in an embodiment of the instant disclosure as an end clamp 202. The end clamp 202 may be used for mounting a module on a rail segment such as rail segment 104. The end clamp 202 may include a clamp 204. The clamp 204 may further include a lateral edge support portion 206 that extends in a first direction 208 to support against a lateral edge of the module. The lateral edge support portion 206 has at least a first surface 210 to face the module and a second surface 212 opposite the first surface 210. The clamp 204 further includes a flange 214 extending in a second direction 216 transverse to the first direction 208 to clamp against an upper surface of the module in coordination with the lateral edge support portion 206. Although shown as two structurally distinct elements in FIG. 2, it is contemplated (and further shown in the mid clamp embodiment, of the universal clamp, in FIG. 5) that the flange 214 may be structurally continuous (i.e., formed materially in an integral manner) with the lateral edge support portion 206.

The end clamp 202 includes a nut 218 configured to align with the clamp 204. The nut 218 has a first end 220 to receive a bolt 222 and a second end 224 opposite the first end 220. The nut 218 has an outer surface 226 shaped to engage with the second surface 212 of the lateral edge support portion 206 of the clamp 204 to prevent rotation of the nut 218. For example, the outer surface 226 of the nut 218 may be shaped to engage at least one side thereof with the second surface 212 of the lateral edge support portion 206 of the clamp 204 to prevent rotation of the nut 218. Moreover, the outer surface 226 of the nut 218 is shaped to engage with the second surface 212 of the lateral edge support portion 206 of the clamp 204 to prevent rotation of the clamp 204. For example, once the nut 218 is engaged with the lateral edge support portion 206 of the clamp 204, the nut 218 then also prevents rotation of the clamp 204. In an embodiment, the nut 218 may have a multi-sided outer surface. For example, the nut 218 may have at least a first side distinguished from a second side by a discontinuity in the directionality of the surface. In a two-sided example, though not depicted in the figures, it is contemplated that a nut could have a circular outer perimeter intersected by a planar portion, which shape thus would be considered to have two-sides. In such a two-sided example, the planar side may engage the second surface 212. Additionally, and/or alternatively, other shapes for the outer surface of the nut 218, having more than two sides, are contemplated including three sides, four sides, five sides, six sides, etc. Moreover, the nut 218 may be an elongated nut formed as a sleeve, as depicted, whereby the elongation provides additional surface area to enhance engagement with the second surface 212. However, it is contemplated that the nut may also be a standard length or even shortened, as long as a side surface thereof effectively engages the second surface 212 to prevent rotation. Thus, as depicted in FIG. 2, in an embodiment the nut 218 may be an elongated hexagonal sleeve. While FIG. 2 illustrates the nut 218 may be an elongated hexagonal sleeve, the nut 218 may be an elongated square sleeve.

The nut 218 and bolt 222 define a height adjustment component where the bolt 222 is connected to the first end 220 of the nut 218 such that, via rotational movement of the bolt 222 within the nut 218, a height of the clamp 204 is adjustable to accommodate a height of a module to be clamped.

The end clamp 202 includes a connection member 228 extending from the second end 224 of the nut 218 in a position that is fixed with respect to the nut 218. A head 230 of the connection member 228 is shaped such that, in a first orientation, the head 230 is accommodated passage through a slot in a rail segment, and in a second orientation, the head is prevented from passage through the slot in the rail segment. The position of the head 230 of the connection member 228 being fixed in an orientation with respect to the outer surface 226 of the nut 218. In an embodiment, as shown, the head 230 of the connection member 228 has a rhomboidal cross-section, whereby a portion to be trapped in a slot in a rail segment to prevent passage therethrough is minimized. In this way, the material of the connection member is minimized as well. Alternatively, it is understood that many other shapes, for either or both of the head of the connection member and the slot in the rail segment, might be used to provide a similar function of trapping and passage, as explained above. Moreover, although the nut 218 is shown as structurally continuous (i.e., formed materially in an integrally manner) in FIG. 2, it is contemplated that the nut 218 may be multiple distinct elements. For example, the connection member 228 may be a structurally distinct element from of the nut 218.

In an embodiment, as shown in FIG. 2, the lateral edge support portion 206 may be structurally defined by a first protrusion (i.e., a planar component that "protrudes" or extends in the first direction 208 and bears the first surface 210 to face the module and the second surface 212 opposite the first surface 210, as described above). The first protrusion of the lateral edge support portion 206 may be further connected in parallel to a second protrusion 232 to form an upside-down U-shape. As depicted, the second protrusion 232 may be structurally continuous by integral formation with the lateral edge support portion 206. Additionally, the second protrusion 232 may include consecutive teeth 234 along an outer side 236 thereof. As explained below, the teeth 234 are engageable with another element of the clamp 204. Therefore, upon installation, the first protrusion of the lateral edge support portion 206 is positioned against the lateral edge of the module, and the second protrusion 232 is positioned parallel to and away from the lateral edge of the module.

In an embodiment, the flange 214 may be continuously connected to an extension 238 having at least two corresponding teeth 240 to engage the consecutive teeth 234 of the second protrusion 232. For example, the at least two corresponding teeth 240 may engage with one or more of the consecutive teeth 234 when the flange 214 clamps against an upper surface of a module in coordination with the lateral edge support portion 206. Although the flange 214 is shown having at least two corresponding teeth 240 along an inside thereof in FIG. 2, it is contemplated that the flange 214 may include consecutive teeth along the inside thereof and the second protrusion 232 may include at least two corresponding teeth along an outer side 236 thereof that are engageable with the consecutive teeth of the second protrusion 232.

FIG. 2 illustrates the outer surface 226 of the nut 218 may have at least two parallel sides such that a first side 242(1) of the parallel sides abuts the second surface 212 of the first protrusion of the lateral edge support portion 206, and a second side 242(2) of the parallel sides abuts an inside surface 244 of the second protrusion 232. As discussed above, the nut 218 may have a multi-sided outer surface. Additionally, and/or alternatively, the nut 218 may have a two-sided outer surface. In a two-sided example, though not depicted, in the figures, it is contemplated that a nut could have a circular outer perimeter intersected by a single planar portion. In such a two-sided example, the single planar portion may engage the second surface 212 or engage the inside surface 244.

FIG. 2 illustrates the lateral edge support portion 206 and the flange 214 include a through hole 246(1) and 246(2). Upon installation, the bolt 222 passes through the through holes 246(1) and 246(2) to connect to the nut 218.

FIG. 2 illustrates the end clamp 202 includes a first end cap 248(1) to cover a right side of the clamp 204 and a second end cap 248(2) to cover a left side of the clamp 204. The first and second end caps 248(1) and 248(2) may include one or more fastening members 250. The one or more fastening members 250 may be one or more press-fit members, snap-fit members, interference-fit members, etc. for securing the first and second end caps 248(1) and 248(2) to the right and left sides of the clamp 204. The first and second end caps 248(1) and 248(2) may include one or more alignment members 252(1) and 252(2). The one or more alignment members 252(1) and 252(2) keep the end caps 248(1) and 248(2) aligned with the flange 214 and/or the extension 238 of the clamp 204, respectively. The one or more fastening members 250 and/or the one or more alignment members 252(1) and 252(2) may keep the end caps 248(1) and 248(2) and clamp 204 securely connected together. The first and second end caps 248(1) and 248(2) may include one or more spring members 254. The one or more spring members 254 being adapted to provide a spring force between the at least two corresponding teeth 240 of the extension 238 and the consecutive teeth 234 of the second protrusion 232. For example, in a default position of the end clamp 202, the at least two corresponding teeth 240 of the extension 238 and the consecutive teeth 234 of the second protrusion 232 are held in engagement because the one or more spring members 254 is sandwiched between the second protrusion 232 and the extension 238. When a user applies a force to a portion (e.g., an end) of the flange 214, with the end clamp 202 assembled, the flange 214 rotates about the bolt 222 proximate to the through holes 246(1) and 246(2). This causes the spring member 254 to flex (e.g., elastically deform) and allows the at least two corresponding teeth 240 of the extension 238 to separate from the consecutive teeth 234 of the second protrusion 232. When a user stops applying the force to the portion of the flange 214, the spring member 254 engages and holds the at least two corresponding teeth 240 of the extension 238 and the consecutive teeth 234 of the second protrusion 232 together.

Figure 3:
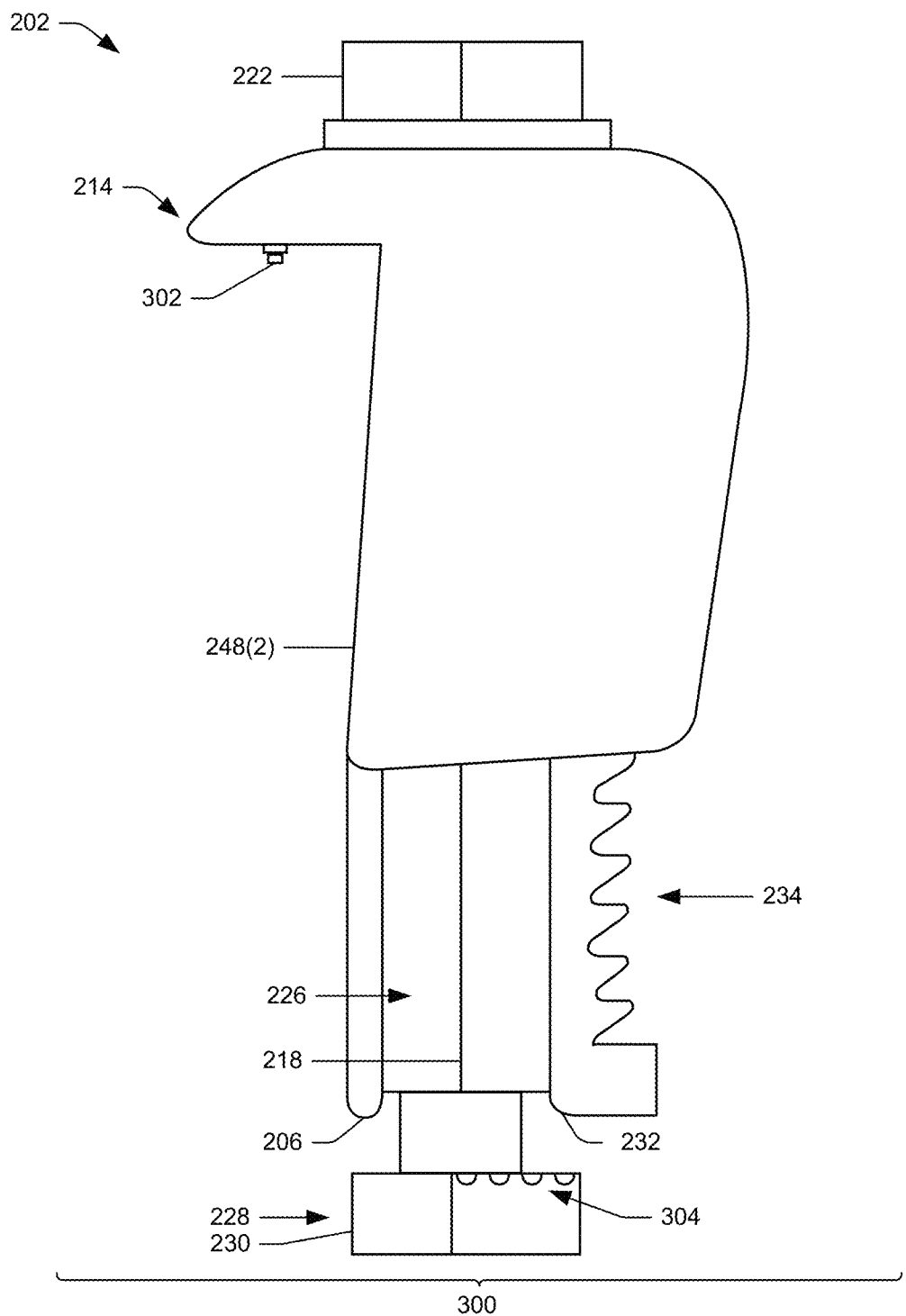
FIG. 3 illustrates an assembled side view of the end clamp of FIG. 2.

FIG. 3 illustrates a side view 300 of the end clamp 202 of FIG. 2. FIG. 3 illustrates the head 230 of the connection member 228 is defined by a T-shape in a side profile thereof (note, as shown, the orientation of the "T" is upside down, formed by the vertically oriented shaft connected to the nut 218, with the horizontally-oriented bar portion connected to the shaft at the lower end of the shaft). Moreover, as is visible in the hidden broken line in FIG. 4 (discussed further herein below), the horizontally-oriented bar portion of the head 230 is longer in a first dimension than in the transverse dimension so as to form a cross-sectional profile of an elongated rhomboid shape. The position of the horizontal bar portion of the T-shape of the head 230 of the connection member 228 is fixed to form, when installed properly, a predetermined angle (described in more detail below) with respect to the pair of the opposing parallel sides 242(1) and 242(2) of the nut 218 at the outer surface 226 of the nut 218.

The flange 214 may include a pin 302 (e.g., bonding pin) disposed in a bottom surface of the flange 214 for puncturing or compromising an anodized layer, a galvanized layer, a painted layer, etc. of a module to electrically bond with module. A top surface of the head 230 of the connection member 228 may include one or more protrusions 304 (e.g., serrations, teeth, etc.) for puncturing or compromising an anodized layer, a galvanized layer, a painted layer, etc. of the rail segment 104 to electrically bond with the rail segment 104. The connection member 228 being electrically bonded with the rail segment 104 and with the nut 218, the nut 218 being electrically bonded with the bolt 222, the bolt 222 being electrically bonded to the clamp 204, and the clamp 204 being electrically bonded to a module when the clamp 204 is assembled and/or installed. The one or more protrusions 304 on the connection member 228 enable penetration of non-conductive anodization finish on aluminum rail and thus the connection member 228 imbed into rail aluminum and provide an electrical bond between the rail and connection member 228, and by assembly connection member 228 to nut 218 and also by assembly nut 218 to bolt 222, and through one or more protrusions (e.g., serrations, teeth, etc.) arranged on the underside of the head of bolt 222, penetrate the anodization on flange 214, thus bonding all the aforementioned items to clamp 204. The clamp 204, bonds to a module through pin 302.

Figure 4:
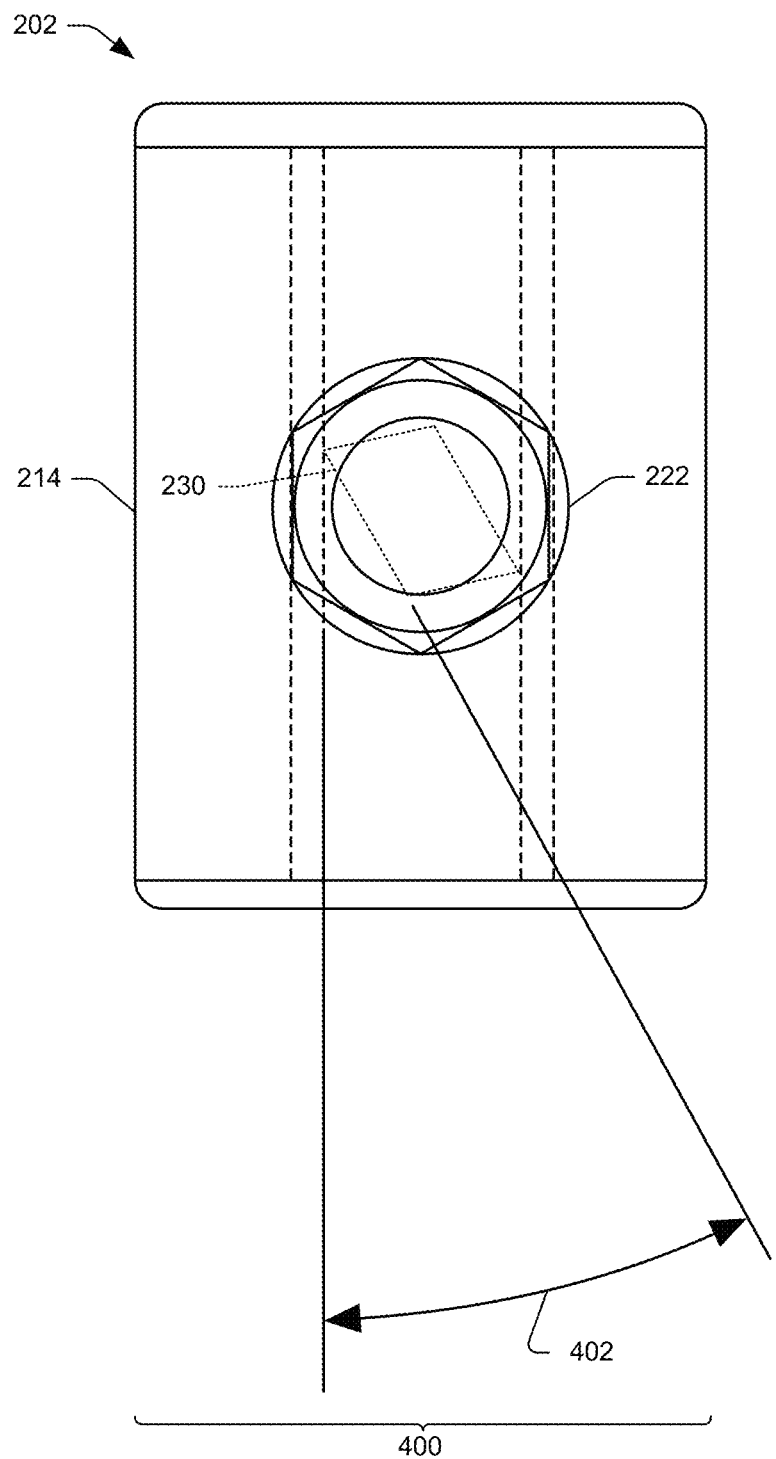
FIG. 4 illustrates an assembled top view of the end clamp of FIG. 2.

FIG. 4 illustrates a top view 400 of the end clamp 202 of FIG. 2. FIG. 4 illustrates the position of the head 230 (shown in hidden broken lines) of the connection member 228 is fixed to form, when installed properly, a predetermined angle 402 with respect to the pair of the opposing parallel sides 242(1) and 242(2) of the nut 218 at the outer surface 226 of the nut 218. The predetermined angle 402 being about 17° to about 37°. The predetermined angle 402 of the head 230 providing for securing the clamp 204 in a desired position when the end clamp 202 is installed to the rail segment 104. For example, at a time of installation, the end clamp 202 may be fully assembled and a user may pass the head 230, in a first orientation, through a slot in the rail segment 104, and then rotate the end clamp 202 until the head 230 having the predetermined angle 402 contacts opposing walls in the rail segment 104. Subsequent to rotating the end clamp 202 to engage the head 230 having the predetermined angle 402 with the opposing walls in the rail segment 104, the engaged head 230 ensures the end clamp 202 is properly positioned for maximum strength of engagement of the head 230 and the rail segment 104.

Figure 5:
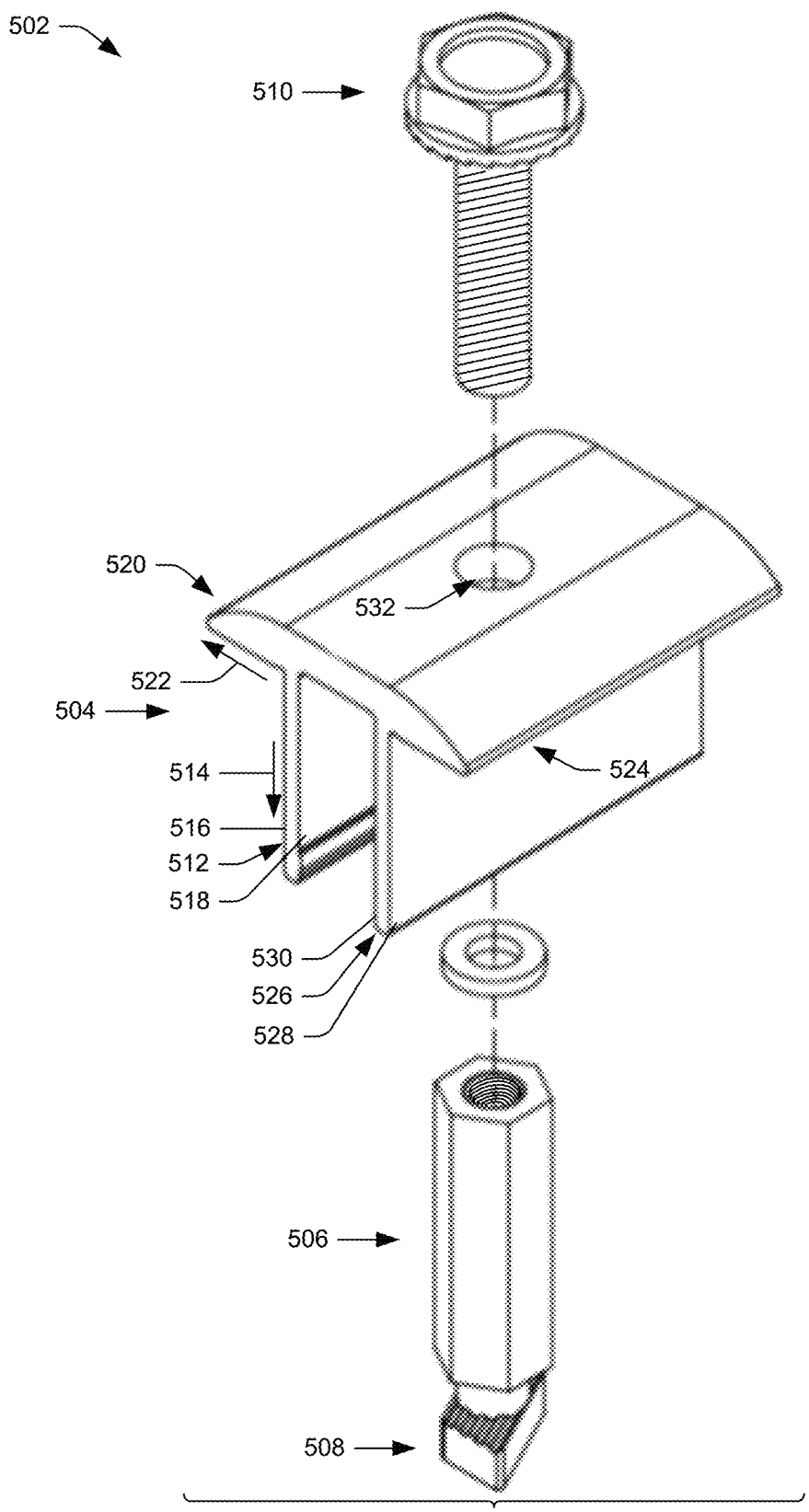
FIG. 5 illustrates an exploded view of a universal clamp in an embodiment of the instant disclosure as a mid clamp.

FIG. 5 illustrates an exploded view 500 of a universal clamp in an embodiment of the instant disclosure as a mid clamp 502. The mid clamp 502 may be used for mounting adjacent modules on a rail segment such as rail segment 104. For example, the mid clamp 502 may mount a pair of modules on the rail segment 104. The mid clamp 502 may include a clamp 504, a nut 506, a connection member 508, and a bolt 510. Inasmuch as a more detailed description of the clamp 504, the nut 506, the connection member 508, and the bolt 510 has been given heretofore, specific details about these mechanisms is not repeated here. However, a brief description of how the clamp 504 relates to mounting a pair of modules is described hereafter.

FIG. 5 illustrates the clamp 504 includes a first lateral edge support portion 512 that extends in a first direction 514 to support against a lateral edge of a first module of adjacent modules. The first lateral edge support portion 512 has at least a first surface 516 to face the first module and a second surface 518 opposite the first surface 516. The clamp 504 may further include a first flange 520 extending in a second direction 522 transverse to the first direction 514 to clamp against an upper surface of the first module in coordination with the first lateral edge support portion 512.

The clamp 504 may further include a second flange 524 extending opposite the second direction 522 such that the clamp 504 is a mid clamp, and the clamp 504 is configured to secure adjacent modules beneath the first flange 520 and the second flange 524, respectively.

The clamp 504 may further include a second lateral edge support portion 526 that extends in a direction parallel to the first direction 514 to support against a lateral edge of a second module of adjacent modules. The second lateral edge support portion 526 has at least a first surface 528 to face the second module and a second surface 530 opposite the first surface 528. Thus, the second flange 524 may clamp against an upper surface of the second module in coordination with the second lateral edge support portion 526. Although the clamp is shown as a structurally continuous (i.e., formed materially in an integral manner) in FIG. 5, it is contemplated (and further shown in the end clamp embodiment, of the universal clamp, in FIG. 2) that the first flange 520 and/or the second flange 524 may be structurally distinct elements from the first lateral edge support portion 512 and/or the second lateral edge support portion 526. For example, the first flange 520 and/or the second flange 524 may be a first structurally continuous portion and the first lateral edge support portion 512 and/or the second lateral edge support portion 526 may be a second structurally continuous portion. In such an embodiment having two structurally distinct elements, the first structurally continuous portion may be secured to the second structurally continuous portion.

As depicted in FIG. 5, the clamp 504 includes a through hole 532 located in an area of the material adjoining the first flange 520 and the second flange 524. Upon installation, the bolt 510 passes through the through hole 532 to connect to the nut 506. The nut 506 and bolt 510 define a height adjustment component where the bolt 510 is connected to the first end of the nut 506 such that, via rotational movement of the bolt 510 within the nut 506, a height of the clamp 502 is adjustable to accommodate heights of adjacent modules beneath the first flange 520 and the second flange 524, respectively, to be clamped.

Figure 6:
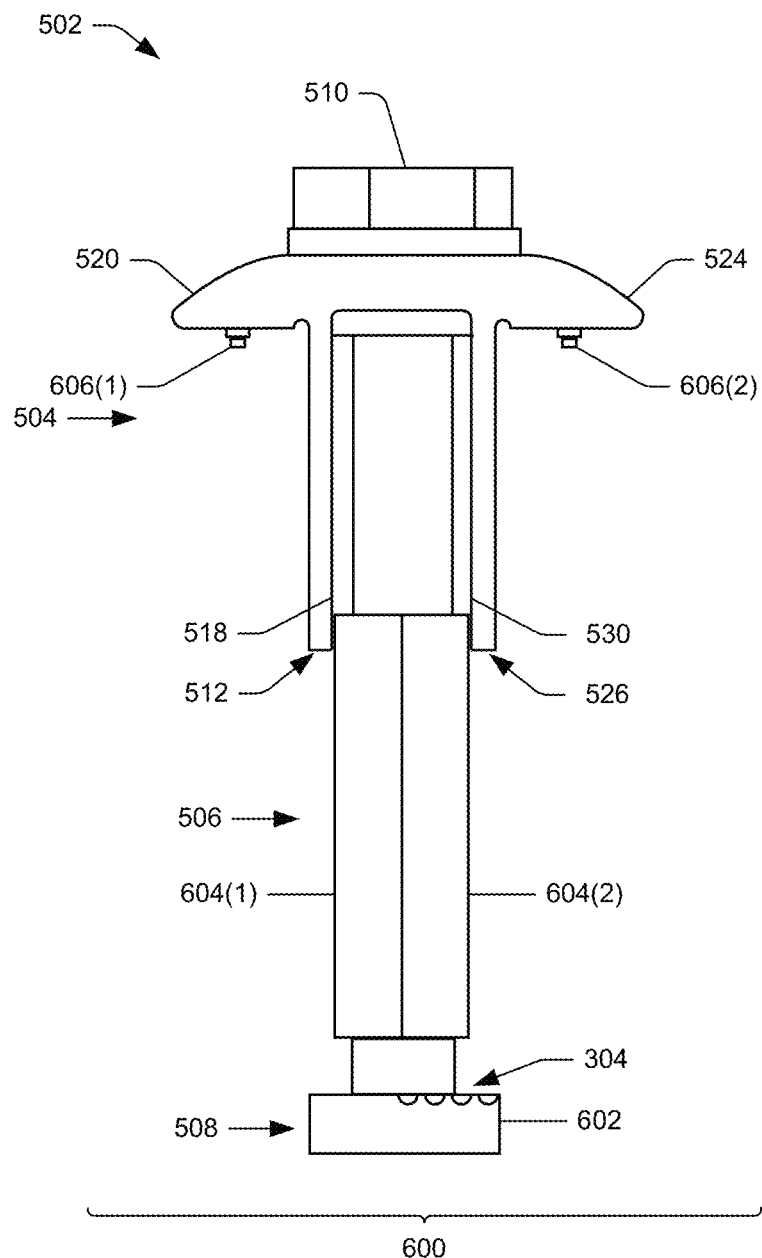
FIG. 6 illustrates an assembled side view of the mid clamp of FIG. 5.

FIG. 6 illustrates a side view 600 of the mid clamp 502 of FIG. 5. FIG. 6 As similarly shown in FIG. 3, FIG. 6 illustrates the head 602 of the connection member 508 is defined by an upside down T-shape in a side profile thereof. The position of the T-shape of the head 602 of the connection member 508 is fixed to form, upon installation, a predetermined angle (described in more detail below) with respect to the pair of the opposing parallel sides 604(1) and 604(2) of the nut 506. The first parallel side 604(1) abuts the second surface 518 of the first lateral edge support portion 512, and the second side 604(2) abuts the second surface 530 of the second lateral edge support portion 526. The opposing parallel sides 604(1) and 604(2) of the nut 506 are engaged with the second surfaces 518 and 530 of the first and second lateral edge support portions 512 and 526. Therefore, the nut 506 and the connection member 508 are configured to be fixed in place, thereby preventing rotational movement.

The head 602 of the connection member 508 may include the one or more protrusions 304 for puncturing or compromising an anodized layer, a galvanized layer, a painted layer, etc. of the rail segment 104 to electrically bond with the rail segment 104.

FIG. 6 further illustrates the first flange 520 and the second flange 524 may each include a pin 606(1) and 606(2), respectively, disposed in the bottom surfaces of the first and second flanges 518 and 522. The pins 606(1) and 606(2), are, like pin 302, configured for puncturing or compromising an anodized layer, a galvanized layer, a painted layer, etc. of adjacent modules beneath the first flange 520 and the second flange 524, respectively, to electrically bond with adjacent modules.

Figure 7:
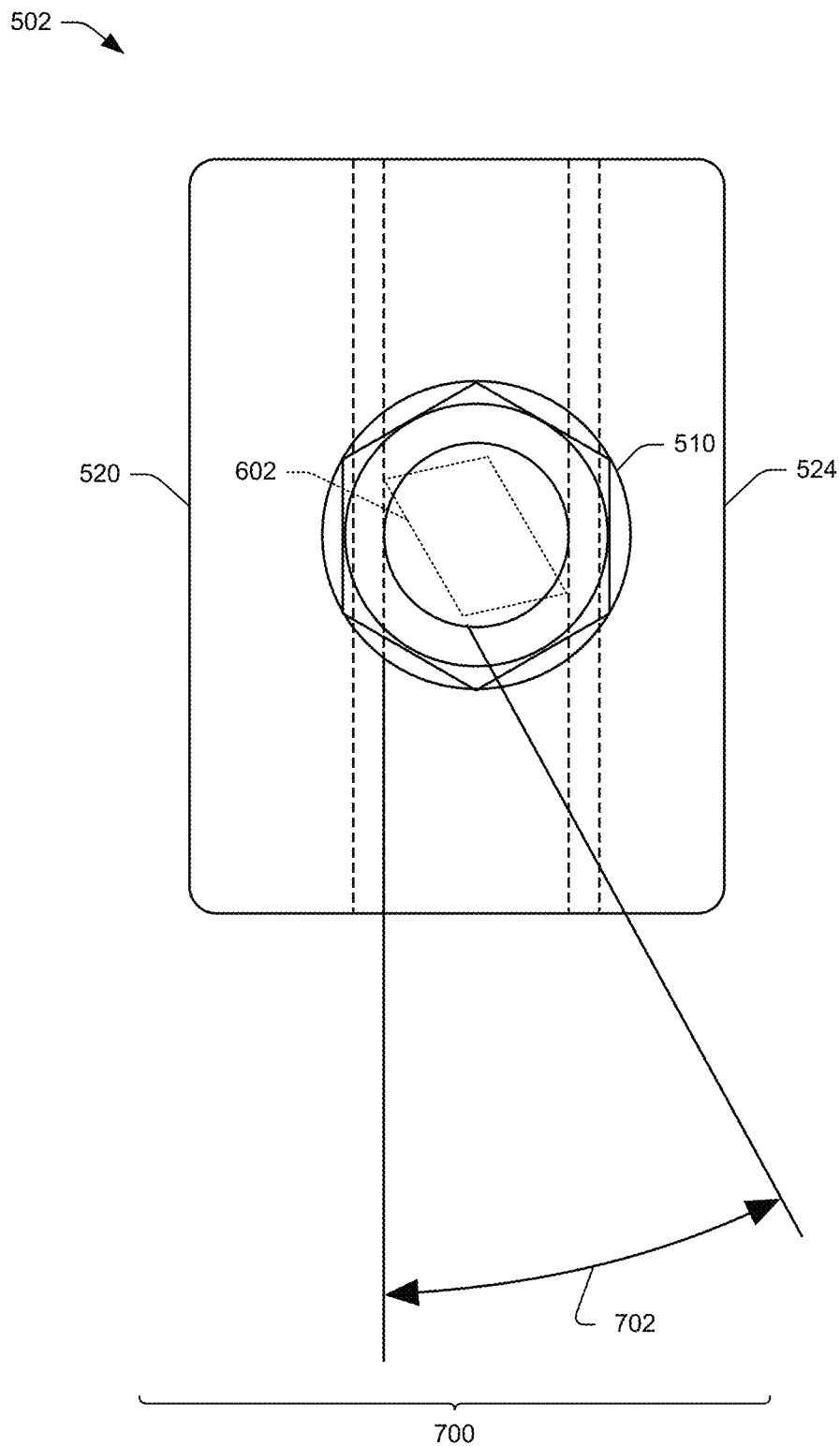
FIG. 7 illustrates an assembled top view of the mid clamp of FIG. 5.

FIG. 7 illustrates a top view 700 of the mid clamp 502 of FIG. 5. As shown, the position of the T-shape of the head 602 (shown in hidden broken lines) of the connection member 508 is fixed to the nut 506 so as to form, when installed, a predetermined angle 702 with respect to the pair of the opposing parallel sides 604(1) and 604(2) of the nut 506 at the outer surface of the nut 506. The predetermined angle 702 being about 17° to about 37°.

Figure 8:
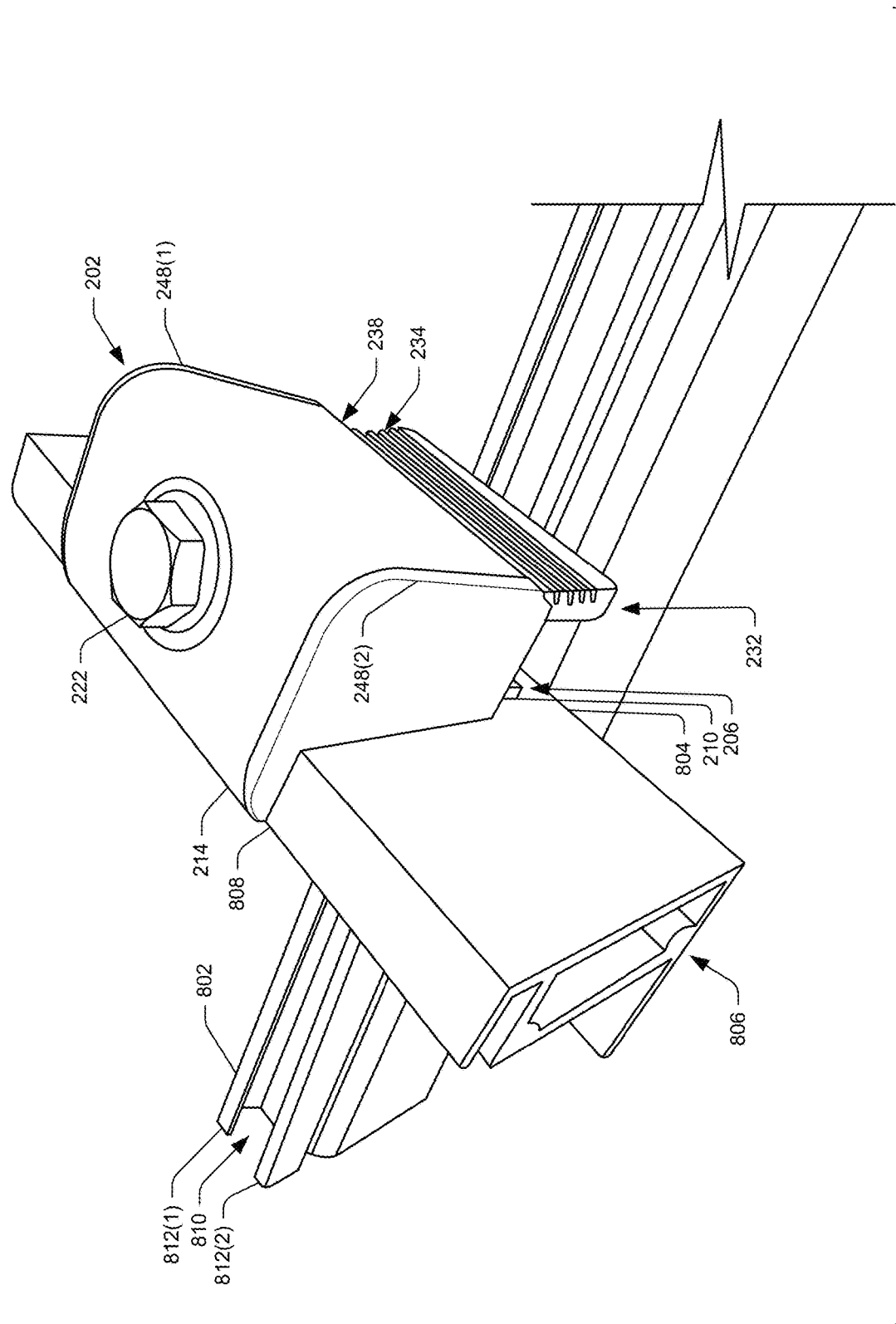
FIG. 8. illustrates an assembled and installed view of the end clamp of FIG. 1 on a rail, according to an embodiment of the instant disclosure.

FIG. 8. illustrates an assembled and installed view 800 of the end clamp 202 of FIG. 2 on a rail segment 802, according to an embodiment of the instant disclosure. FIG. 8 illustrates the first surface 210 of the lateral edge support portion 206 against a lateral edge 804 of a portion of a module 806 and the flange 214 clamped against an upper surface 808 of the module 806 in coordination with the lateral edge support portion 206.

FIG. 8 additionally illustrates the consecutive teeth 234 of the second protrusion 232 engaged with the at least two corresponding teeth 240 (not visible in FIG. 8) of the extension 238 while the flange 214 clamps against the upper surface 808 of the module 806 in coordination with the lateral edge support portion 206. Further, as shown, the first end cap 248(1) covers the right side of the clamp 204, and the second end cap 248(2) covers the left side of the clamp 204.

Moreover, FIG. 8 depicts a slot 810 in the rail segment 802. As discussed above, the head 230 of the connection member 228 is shaped such that, in a first orientation, the head 230 is accommodated passage through the slot 810 in the rail segment 802, and in a second orientation, the head 230 is prevented from passage through the slot 810 in the rail segment 802. Because the head 230 of the connection member 228 has a rhomboidal cross-section, a portion of the head 230 is trapped in the slot 810 in the rail segment 802 to prevent passage of the head 230 through the slot 810. The one or more protrusions 304 of the head 230 of the connection member 228 may puncture or compromise an anodized layer, a galvanized layer, a painted layer, etc. of a bottom portion of one or more opposing lips 812(1) and 812(2) that define the slot 810 of the rail segment 802 to electrically bond with the rail segment 802.

Before tightening the bolt 222 with the nut 218, the end clamp 202 may be slideably displaced along the slot 810 of the rail segment 802 to position the end clamp 202 on the rail segment 802 to accommodate the module 806. Subsequent to positioning the end clamp 202 to accommodate the module 806, the bolt 222 may be tightened with the nut 218 to engage the at least two corresponding teeth 240 of the extension 238 with consecutive teeth 234 of the second protrusion 232. The nut 218 may then be tightened to engage the at least two corresponding teeth 240 of the extension 238 with consecutive teeth 234 of the second protrusion 232 to adjust a height of the clamp 204 to accommodate a height of the module 806.

Figure 9:
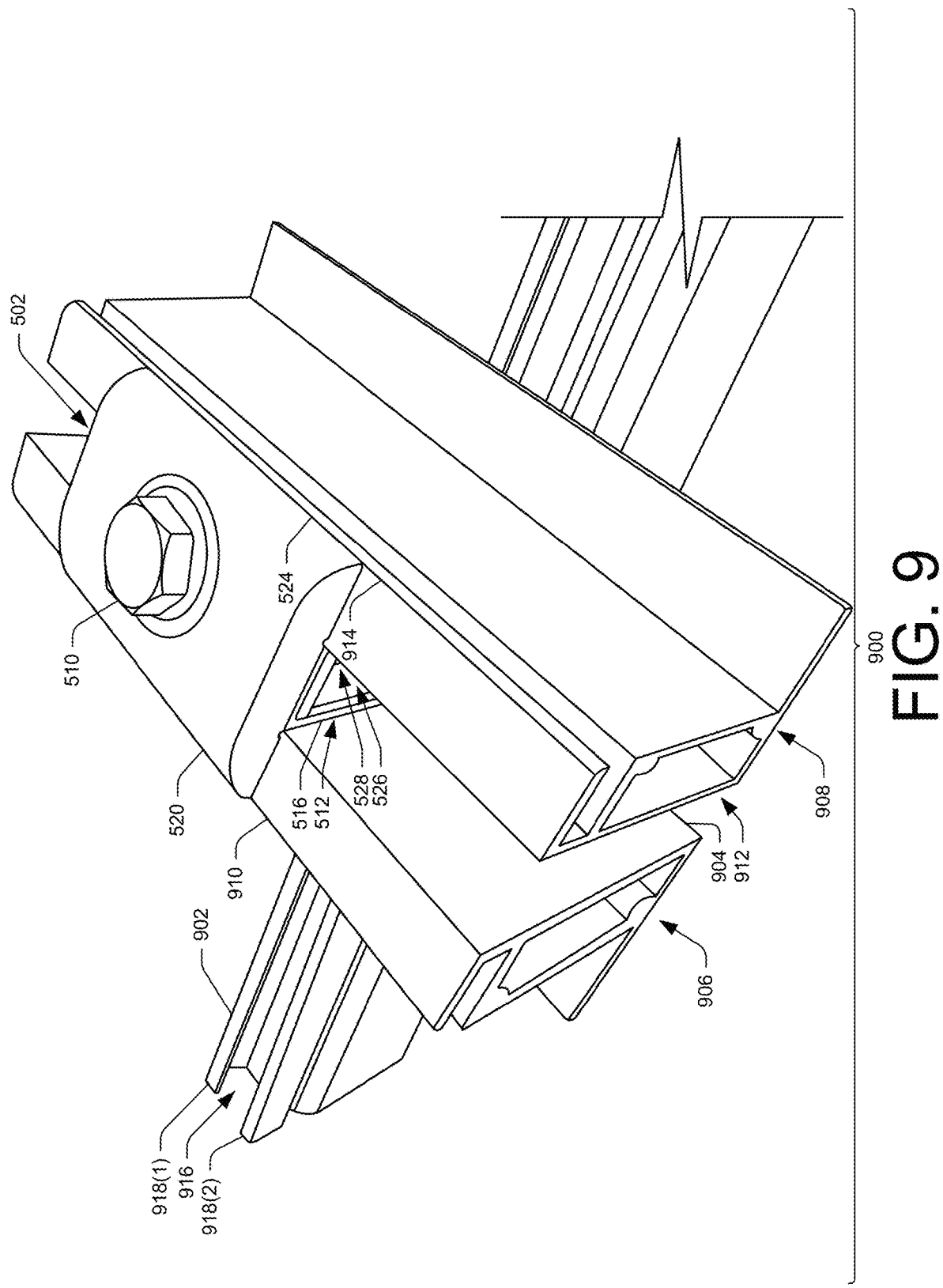
FIG. 9. illustrates an assembled and installed view of the mid clamp of FIG. 5 on a rail, according to an embodiment of the instant disclosure.

FIG. 9. illustrates an assembled and installed view 900 of the mid clamp 502 of FIG. 5 on a rail segment 902, according to an embodiment of the instant disclosure. FIG. 9 illustrates the first surface 516 of the first lateral edge support portion 512 against a lateral edge 904 of a portion of a first module 906 adjacent to a second module 908. The first flange 520 is clamped against an upper surface 910 of the first module 906 in coordination with the first lateral edge support portion 516.

The first surface 528 of the second lateral edge support portion 526 is disposed against a lateral edge 912 of a portion of the second module 908 and the second flange 524 is clamped against an upper surface 914 of the second module 908 in coordination with the second lateral edge support portion 526.

Similar to the embodiment in FIG. 8, FIG. 9 also illustrates a slot 916 in the rail segment 902. As discussed above, the head 602 of the connection member 508 is shaped such that, in a first orientation, the head 602 is accommodated passage through the slot 916 in the rail segment 902, and in a second orientation, the head 602 is prevented from passage through the slot 916 in the rail segment 902. Because the head 602 of the connection member 508 has a rhomboidal cross-section, a portion of the head 602 is trapped in the slot 916 in the rail segment 902 to prevent passage of the head through the slot 916. The one or more protrusions of the head of the connection member 508 may puncture or compromise an anodized layer, a galvanized layer, a painted layer, etc. of a bottom portion of one or more opposing lips 918(1) and 918(2) that define the slot 916 of the rail segment 902 to electrically bond with the rail segment 902.

Before tightening the bolt 510 with the nut 506, the mid clamp 502 may be slideably displaced along the slot 916 of the rail segment 902 to position the mid clamp 502 on the rail segment 902 to accommodate the first module 906 and/or the second module 908. Subsequent to positioning the mid clamp 502 to accommodate the accommodate the first module 906 and/or the second module 908, the bolt 510 may be tightened with the nut 506. The nut 218may then be tightened to clamp the first and second flanges 520 and 524 against the upper surfaces 910 and 914 of the first and second modules 906 and 908 to adjust a height of the clamp 502 to accommodate heights of the first and second modules 906 and 908.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A clamp assembly for mounting a solar panel module ("module") on an intermediary member, the clamp assembly comprising:
   a clamp including:
      a lateral edge support portion that extends in a first direction to support against a lateral edge of the module, the lateral edge support portion having at least a first surface to face the module and a second surface opposite the first surface, and
      a flange that extends in a second direction transverse to the first direction to clamp against an upper surface of the module in coordination with the lateral edge support portion;
   a nut configured to align with the clamp, the nut having a first end to receive a fastener and a second end opposite the first end, the nut having an outer surface, wherein the second surface of the lateral edge support portion of the clamp and the outer surface of the nut extend in parallel such that the second surface and the outer surface engage planarly to prevent rotation of the nut; and
   a connection member extending from the second end of the nut in a position that is fixed, a head of the connection member being shaped such that, in a first orientation, the head is accommodated passage through a slot in the intermediary member, and in a second orientation, the head is prevented from passage through the slot in the intermediary member.

2. The clamp assembly according to claim 1, wherein a position of the head of the connection member is fixed in an orientation with respect to the outer surface of the nut.

3. The clamp assembly according to claim 1, wherein the nut and a bolt define a height adjustment component, wherein the bolt is connected to the nut such that, via rotational movement of the bolt within the nut, a height of the clamp is adjustable to accommodate a height of a module.

4. The clamp assembly according to claim 1, wherein the lateral edge support portion includes:
   a first protrusion having the first surface that faces the module on an outside thereof and the second surface that faces away from the module on an inside thereof, and
   a second protrusion that is parallel to the first protrusion, the second protrusion having an inside surface that faces the first protrusion and outside surface that faces the second protrusion, and
   wherein the outer surface of the nut has at least two parallel sides such that:
      a first side of the parallel sides engages planarly with the second surface of the first protrusion of the lateral edge support portion, and
      a second side of the parallel sides engages planarly with the inside surface of the second protrusion.

5. The clamp assembly according to claim 1, wherein the nut is hexagonal or the nut is square.

6. The clamp assembly according to claim 1, wherein the flange is structurally continuous with the lateral edge support portion.

7. The clamp assembly according to claim 1, wherein the flange is a first flange, and
   wherein the clamp further includes a second flange extending opposite the second direction such that the clamp is a mid clamp, and the clamp is configured to secure adjacent modules beneath the first flange and the second flange, respectively.

8. The clamp assembly according to claim 1, wherein the clamp is an end clamp such that the lateral edge support portion is defined by a first protrusion connected in parallel to a second protrusion to form an upside-down U-shape, the first protrusion being positioned, upon installation, against the lateral edge of the module, and the second protrusion having consecutive teeth along an outer side thereof, and
   wherein the flange is continuously connected to an extension having at least two corresponding teeth to engage the teeth of the lateral edge support portion.

9. A clamp assembly for mounting a solar panel module ("module") on an intermediary member, the clamp assembly comprising:
   a clamp including:
      a lateral edge support portion that extends in a first direction to support against a lateral edge of the module, the lateral edge support portion having at least a first surface to face the module and a second surface opposite the first surface, and
      a flange that extends in a second direction transverse to the first direction to clamp against an upper surface of the solar panel module in coordination with the lateral edge support portion;
   a height adjustment component including:
      a nut configured to align with the clamp, the nut having a first end and a second end opposite the first end, the nut having an outer surface, wherein the second surface of the lateral edge support portion of the clamp and the outer surface of the nut extend in parallel such that the second surface and the outer surface engage planarly to prevent rotation of the nut, and
      a fastener configured to connect to the first end of the nut such that, via rotational movement between the nut and the fastener, the height of the clamp is adjustable to accommodate a height of the module; and
      a connection member extending from the second end of the nut in a fixed position, a head of the connection member being shaped such that, in a first orientation, the head is accommodated passage through a slot in the intermediary member, and in a second orientation, the head is prevented from passage through the slot in the intermediary member.

10. The clamp assembly according to claim 9, wherein the nut is a hexagonal sleeve,
    wherein the head of the connection member is defined by a T-shape in a side profile thereof, and
    wherein a position of the T-shape of the head of the connection member is fixed to form a predetermined angle with respect to a pair of opposing parallel sides of the hexagonal sleeve at the outer surface of the nut.

11. The clamp assembly according to claim 10, wherein the predetermined angle is about 17° to about 37°.

12. The clamp assembly according to claim 10, wherein the lateral edge support portion is defined by a first protrusion connected in parallel to a second protrusion to form an upside-down U-shape, and
    wherein, upon installation, the pair of opposing parallel sides of the hexagonal sleeve at the outer surface of the nut is engaged with the lateral edge support portion such that a first side of the opposing parallel sides is engaged planarly with the first protrusion, and a second side of the opposing parallel sides is engaged planarly with the second protrusion, whereby the nut and the connection member are fixed in place, thereby preventing rotational movement.

13. The clamp assembly according to claim 12, wherein upon installation, when in the second orientation, the predetermined angle is measured between a plane coplanar with the first side or the second side of the opposing parallel sides and a plane coplanar with a side of parallel length sides of the head of the connection member.

14. The clamp assembly according to claim 10, wherein the head of the connection member has a rhomboidal cross-section, whereby a portion to be trapped in the slot in the intermediary member to prevent passage therethrough is minimized, thereby minimizing material of the connection member.

15. A clamp assembly for mounting a solar panel module ("module") on an intermediary member, the clamp assembly comprising:
   a clamp including:
      a lateral edge support portion that extends in a first direction to support against a lateral edge of the module, the lateral edge support portion having at least a first surface to face the module and a second surface opposite the first surface, and
      a flange that extends in a second direction transverse to the first direction to clamp against an upper surface of the solar panel module in coordination with the lateral edge support portion;
   a height adjustment component including:
      a nut configured to align with the clamp, the nut having a first end and a second end opposite the first end, the nut having a multi-sided outer surface,
      wherein the second surface of the lateral edge support portion of the clamp and at least one side of the multi-sided outer surface of the nut extend in parallel such that the second surface and the at least one side of the multi-sided outer surface engage planarly to prevent rotation of the nut, and a bolt to connect to the first end of the nut such that, via rotational movement between the nut and the bolt, the height of the clamp is adjustable to accommodate a height of the module; and a connection member extending from the second end of the nut in a fixed position, a head of the connection member being shaped such that, in a first orientation, the head is accommodated passage through a slot in the intermediary member, and in a second orientation, the head is prevented from passage through the slot in the intermediary member, and a position of the head of the connection member being fixed with respect to the outer surface of the nut.

16. The clamp assembly according to claim 15, wherein the clamp is an end clamp, and wherein the clamp assembly further comprises:
a first end cap to cover a right side of the clamp; and
a second end cap to cover a left side of the clamp.

17. The clamp assembly according to claim 15, wherein the lateral edge support portion and the flange include a through hole, respectively, via which the bolt passes upon installation to connect to the nut.

18. The clamp assembly according to claim 15, wherein the nut is hexagonal.

19. The clamp assembly according to claim 15, wherein the head of the connection member is defined by a T-shape in a side profile thereof.

20. The clamp assembly according to claim 15, wherein the lateral edge support portion includes:
a first protrusion having the first surface that faces the module on an outside thereof and the second surface that faces away from the module on an inside thereof, and
a second protrusion that is parallel to the first protrusion, the second protrusion having an inside surface that faces the first protrusion and outside surface that faces the second protrusion, and
wherein the multi-sided outer surface of the nut has at least two parallel sides such that:
a first side of the parallel sides abuts planarly with the second surface of the first protrusion of the lateral edge support portion, and
a second side of the parallel sides abuts planarly with the inside surface of the second protrusion.

\* \* \* \* \*